United States Patent [19]

Goldbach et al.

[11] Patent Number: 5,236,354
[45] Date of Patent: Aug. 17, 1993

[54] POWER PLANT WITH EFFICIENT EMISSION CONTROL FOR OBTAINING HIGH TURBINE INLET TEMPERATURE

[75] Inventors: Gerhardt O. Goldbach, San Jose; John C. Haas, San Carlos; Frank Walton, Los Altos, all of Calif.

[73] Assignee: Combustion Power Company, Inc., Menlo Park, Calif.

[21] Appl. No.: 672,067

[22] Filed: Mar. 18, 1991

[51] Int. Cl.$^5$ .................... F02B 43/00; F02G 3/00
[52] U.S. Cl. .................. 60/39.02; 60/39.12; 110/212; 431/3; 431/5; 431/7
[58] Field of Search ............... 60/39.02, 39.12, 39.464; 110/212; 431/5, 7, 3

[56] References Cited

U.S. PATENT DOCUMENTS

| 4,116,005 | 9/1978 | Willyoung | 60/655 |
| 4,767,315 | 8/1988 | Brannstrom et al. | 431/7 |
| 4,843,981 | 7/1989 | Goldbach et al. | 110/347 |
| 4,845,942 | 7/1989 | Schemenau et al. | 60/39.464 |
| 4,928,635 | 5/1990 | Shelor | 122/7 |
| 4,996,836 | 3/1991 | Reh et al. | 60/39.12 |
| 5,016,435 | 5/1991 | Brannstrom | 60/39.464 |

FOREIGN PATENT DOCUMENTS

| 0044094 | 1/1982 | European Pat. Off. |
| 3009366 | 9/1981 | Fed. Rep. of Germany. |
| 2583305 | 12/1986 | France. |
| 1601212 | 10/1981 | United Kingdom | 431/7 |

OTHER PUBLICATIONS

Anon, "The Coal-Fired Air Furnace Combined Cycle Therodynamic Analysis of an Externally-Fired Gas Turbine Electric Generation Plant," Pittsburgh Energy Technology Center, U.S. Dept. of Energy, Jul. 1990.
Zabolotny, Vivenzio and Lettaye, "Externally-Fired Combined Cycle (EPCC)," Proceedings of the American Power Conference, 52nd Annual Meeting, TP 90-26, Apr. 1990.

Primary Examiner—Richard A. Bertsch
Assistant Examiner—Howard R. Richman
Attorney, Agent, or Firm—Flehr, Hohbach, Test, Albritton & Herbert

[57] ABSTRACT

A power plant with efficient emission control and high turbine inlet temperatures is disclosed. The power plant includes a combustor for the combustion of carbonaceous sulfur-bearing fuel. The combustion of this fuel produces a hot gas with $SO_x$ and $NO_x$ contaminants. This gas is conveyed to a refractory heat exchanger where some of the heat from the gas is transferred to a pressurized air stream. The gas is then conveyed to a fluidized bed reactor. The fluidized bed reactor includes a central chamber with a fluidized bed positioned at the base of the chamber. Heat exchangers are positioned within the fluidized bed. These heat exchangers preheat the pressurized air stream which is then conveyed to the refractory heat exchanger and later conveyed to a turbine assembly. The fluidized bed reactor also includes circulating particulate matter, such as CaO. Ammonia may also be injected into the fluidized bed reactor. When operating at a temperature of at least 1,500° F., the fluidized bed reactor facilitates chemical reactions between the CaO and the $SO_x$ contaminants. The fluidized bed reactor also facilitates chemical reactions between the ammonia and $NO_x$ contaminants. These reactions significantly reduce the contaminants originally found in the hot, dirty gas.

17 Claims, 3 Drawing Sheets

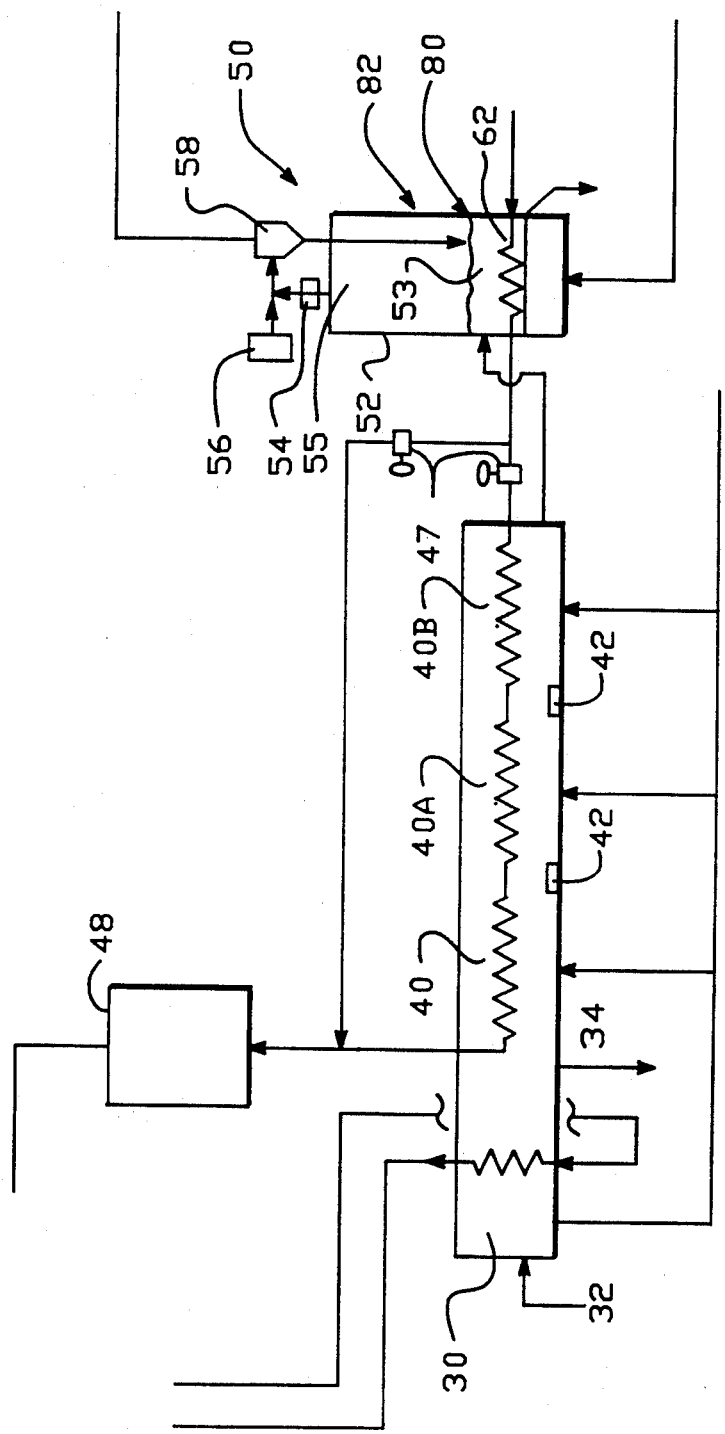
FIG.—3

POWER PLANT WITH EFFICIENT EMISSION CONTROL FOR OBTAINING HIGH TURBINE INLET TEMPERATURE

BRIEF DESCRIPTION OF THE INVENTION

The present invention relates to a power plant with efficient emission control for obtaining high turbine inlet temperatures. More particularly, the present invention relates to a fuel combustor coupled to a fluidized bed reactor which provides emission control while preheating the air which is fed to the turbine inlet.

BACKGROUND OF THE INVENTION

Improving the efficiency of power plants is an ongoing process. This process assumes greater urgency in light of the threat of global warming. Power plants of the future must be as efficient as possible to reduce the amount of carbon dioxide emitted into the atmosphere. This is particularly important for power plants that burn coal because coal has a much higher carbon to hydrogen ratio than oil or natural gas and emits more carbon dioxide.

The U.S. has abundant coal resources which must be utilized to avoid large imports of oil and natural gas. Unfortunately, much of this coal contains contaminants of sulfur, nitrogen and particulate that cannot be released into the atmosphere. Therefore, it is important to identify ways of burning coal at the highest efficiencies without polluting the atmosphere.

To obtain high efficiency in a thermodynamic power plant, the working fluid must be heated to the highest temperature possible. Gas turbines of the current state of the art can utilize inlet temperatures of 2,350° F. or above but only with clean fuels or heated air. Presently, steam power plants generally achieve turbine inlet temperatures of approximately 1,100° F. Thus, current power plants which employ dirty fuel are not used to their full potential.

One approach to achieve optimal temperatures with coal is to gasify it and clean the coal gas prior to combustion. This approach is technically feasible but economically marginal because it is very difficult to gasify coal and clean coal gas.

Slagging furnaces are one approach to obtain high inlet temperatures. However, these furnaces are dirty, therefore they require expensive and elaborate controls to suppress pollution, which results in the furnaces being inefficient.

Fluidized bed reactors are known in the art for heating air in tubes up to temperatures of 1500° F. However, if one attempts to obtain a higher heat in a fluidized bed reactor, pollution suppression in the bed is no longer feasible. Thus, fluidized bed reactors have not been successfully employed for obtaining high turbine inlet temperatures.

OBJECTS AND SUMMARY OF THE INVENTION

It is a general object of the present invention to provide an improved power plant with efficient emission control for obtaining high turbine inlet temperatures.

It is a related object of the present invention to provide a method and apparatus for burning coal efficiently without polluting the atmosphere.

It is a more particular object of the present invention to obtain high turbine inlet temperatures from a single, abundant fuel source, while efficiently suppressing pollutants.

It is another object of the present invention to provide a power plant which operates without the necessity of gasifying coal.

It is still another object of the present invention to use a slagging furnace while providing efficient pollution suppression.

It is yet another object of the present invention to utilize a fluidized bed reactor while obtaining optimal turbine inlet temperatures of approximately 2,300° F.

It is another object of the present invention to provide a fluidized bed reactor which serves to preheat turbine inlet air while suppressing pollutants.

These and other objects are obtained by a power plant with efficient emission control and high turbine inlet temperatures. The power plant includes a combustor for the combustion of carbonaceous sulfur-bearing fuel. The combustion of this fuel produces a hot gas with $SO_x$ and $NO_x$ contaminants. This gas is conveyed to a refractory heat exchanger where some of the heat from the gas is transferred to a pressurized air stream. The gas is then conveyed to a fluidized bed reactor. The fluidized bed reactor includes a central chamber with a fluidized bed positioned at the base of the chamber. Heat exchangers are positioned within the fluidized bed. These heat exchangers preheat the pressurized air stream which is then conveyed to the refractory heat exchanger and later conveyed to a turbine assembly. The fluidized bed reactor also includes circulating particulate matter, such as CaO. Ammonia may also be injected into the fluidized bed reactor. When operating at a bed temperature of at least 1,500° F., the fluidized bed reactor facilitates chemical reactions between CaO and $SO_x$ contaminants. The fluidized bed reactor also facilitates chemical reactions between injected ammonia and $NO_x$ contaminants. These reactions significantly reduce the contaminants originally found in the hot, dirty gas.

BRIEF DESCRIPTION OF THE DRAWINGS

Other objects and advantages of the invention will become apparent upon reading the following detailed description and upon reference to the drawings, in which:

FIG. 3 is a schematic view of a portion of the power plant of FIG. 1 with a plurality of heat exchangers, in accordance with an alternate embodiment of the present invention.

DETAILED DESCRIPTION OF THE INVENTION

Figure 1:
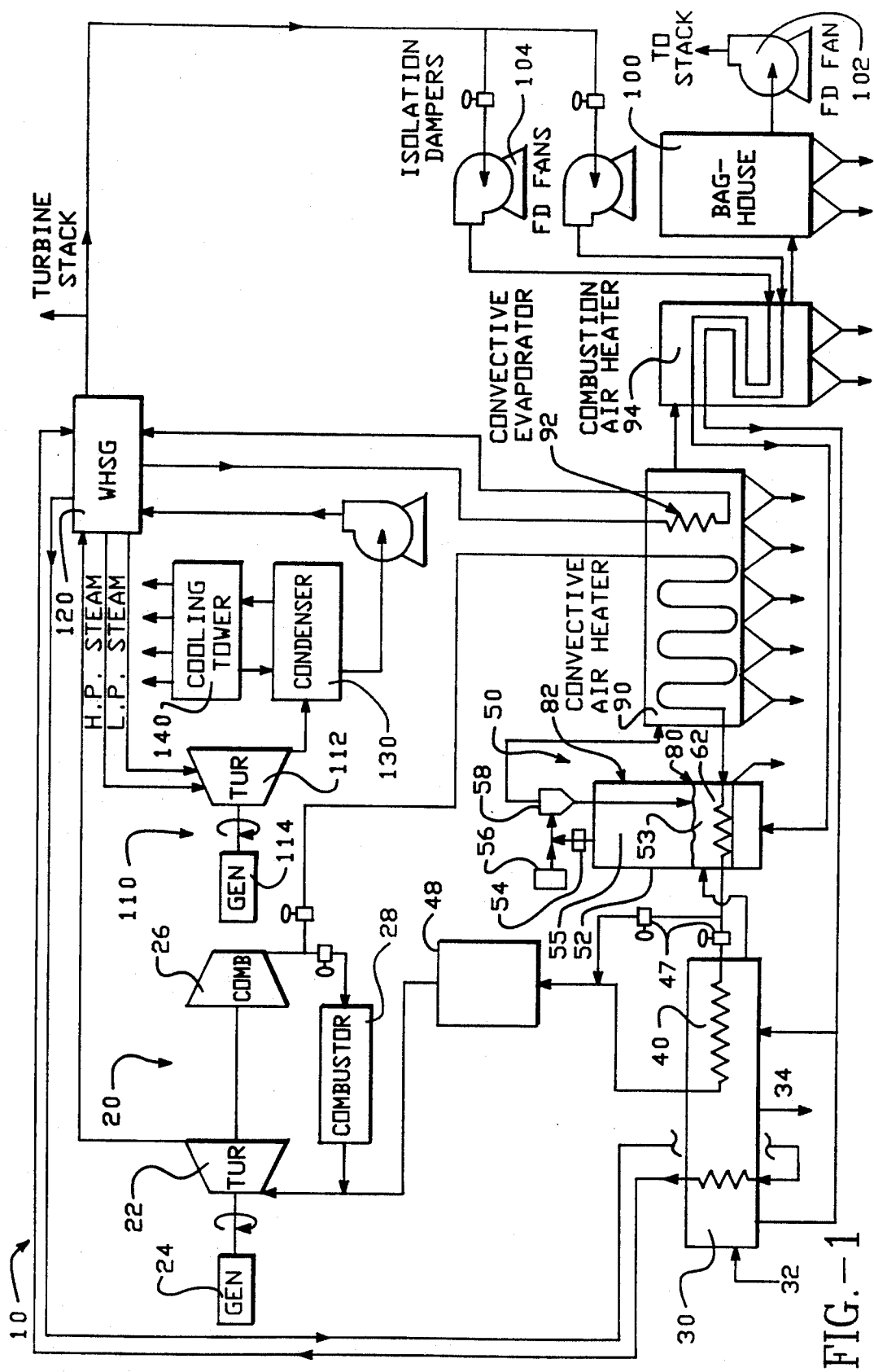
FIG. 1 is a schematic view of a power plant with enhanced emission control and turbine inlet temperatures in accordance with the present invention.

Turning now to the drawings, wherein like components are designated by like reference numerals in the various figures, attention is initially directed to FIG. 1. Power plant 10 includes many components which are well known in the art. Turbine assembly 20 includes a turbine 22, a generator 24, and a compressor 26. It may also include a bypass combustor 28. These elements are known in the art.

The turbine assembly 20 is driven by a high temperature pressurized air stream. Combustion products from a slagging solid fuel combustor 30 heat the pressurized air stream through heat exchangers 40. The combustion products contain $SO_x$ and $NO_x$ contaminates. Preferably, slagging solid fuel combustor 30 includes fuel inlet 32 and ash outlet 34.

The hot dirty gases are subsequently conveyed to fluidized bed reactor 50 to remove pollutants. From the fluidized bed reactor 50, the still-hot gases are fed to convective air heater 90 where they exchange heat with the pressurized air stream from the compressor 26. This pressurized air stream is then conveyed to heat exchanger 62 positioned within the fluidized bed 53 of the fluidized bed reactor 50. As a result, the pressurized air stream is heated even further before it is conveyed to the refractory heat exchanger 40.

After further heating in the refractory heat exchanger, the pressurized air stream is fed to the turbine assembly 20. A topping combustor 48, using a clean burning fuel such as natural gas, may be employed between the turbine assembly 20 and the refractory heat exchanger 40 to provide yet additional heating of the air stream before conveyance to the turbine 22. Topping combustor 48, in conjunction with air duct valves 47, may also be used to heat the air to the desired turbine inlet level when the slagging combustor 30 or heat exchanger 40 are inoperative due to servicing or operating problems.

One skilled in the art will appreciate from this general overview the novelty of the present invention. Moreover, the efficiencies and improvements of the power plant of the present invention will also be appreciated. Specifically, the coupling of combustor 30 and the fluidized bed reactor 50 is novel. While fluidized bed reactors have been used in the prior art as combustors, they have not been used for cleaning hot dirty gases from another combustor. In addition, pollution suppressing fluidized bed reactors have not been used in the prior art prerequisite to heating clean air which is then fed to a refractory heat exchanger and subsequently to a turbine inlet.

Thus, as can be appreciated by one skilled in the art, a number of advantages are realized with the present invention. First, a slagging coal burner can be cleanly and efficiently used as a combustor without elaborate emission controls. Decoupling of the emission control from the slagging coal burner results in a simplified combustor. As a result, attention can be directed towards achieving the required ash capture via slagging, reducing the ash particulate size penetrating the slag screen, control of temperatures within the furnace, removing heat from the slagging furnace, and making the refractory heat exchanger operate reliably with the exhaust of the slagging coal burner. By not making the slagging coal burner a major contributor to the $NO_x$ and $SO_x$ reduction processes, the necessity of providing operating windows dictated by $NO_x$ and $SO_2$ controls is eliminated.

Other advantages are readily apparent. For instance, the emission control is executed at elevated temperatures of 1,500° F. to 1,700° F., this allows for particularly efficient pollution suppression. Moreover, this approach also utilizes existing heat for preheating turbine gases. More specifically, the preheating of the turbine gases in heat exchangers positioned in the fluidized bed is extremely efficient. This approach allows for significant preheating of the turbine gases with small surface area heat exchangers before reaching the refractory heat exchanger. This heat exchanger arrangement efficiently obtains extremely high turbine inlet temperatures. In addition, the power plant of the present invention is driven solely by coal, and thus does not consume less abundant resources.

Other advantages will become apparent with closer consideration of the present invention. The slagging solid fuel combustor 30 is preferably designed to burn coal at temperatures of 2,700° F. or greater and retain approximately 90% of the slag on a slag screen, passing only 10 micron particles of slag into the refractory heat exchanger 40. The refractory heat exchanger 40 is closely coupled to combustor 30 to reduce heat loss. The refractory heat exchanger 40 rapidly cools the combustion products from the combustor 30 from 2,700° F. to 2,300° F. by radiation. At this reduced temperature, the remaining ash particles will solidify and no longer be sticky. In a preferable design, the refractory heat exchanger 40 uses silicon carbide tubes held in a shell and tube configuration.

In another embodiment of the present invention, the slagging combustor 30 may be operated substoichiometrically in conjunction with a plurality of heat exchangers 40, as depicted in FIG. 3. In such a staged combustion heat transfer apparatus, the partially reacted gas can be fully burned out in stages. For example, after substoichiometric operation of the slagging combustor 30, using 60% of the stoichiometric quantity of air, the inlet temperature to the heat exchanger would not be as high as the 2,700° F. previously described. Nevertheless, heat would be exchanged through heat exchanger 40. After a first heat exchanger 40, combustion air feed 42 would inject combustion air and thereby boost the combustion heat temperature before entering another heat exchanger 40A. The amount of combustion air provided at any stage is limited to insure that the ash particles are not heated to the extent that they become sticky and thereby obstruct the operation of the heat exchanger 40. This staging of heat exchangers may be repeated to obtain efficient heat transfer, in accordance with the invention.

In either embodiment, the still hot combustion gas from the combustor 30 leaves the refractory heat exchanger 40 at approximately 1,650° F. Preferably, the gas is injected into fluidized bed reactor 50 just above the surface of the fluidized bed 53 which is between 1,350° F. and 1,650° F. In another embodiment, the gas is injected below the surface of the fluidized bed 53

In accordance with the invention, large quantities of gas from the combustor 30 can be fed to the fluidized bed reactor 50. Flow rate from the combustor 30 can be up to five times the flow rate of the combustion gas from the fluidized bed 53.

Figure 2:
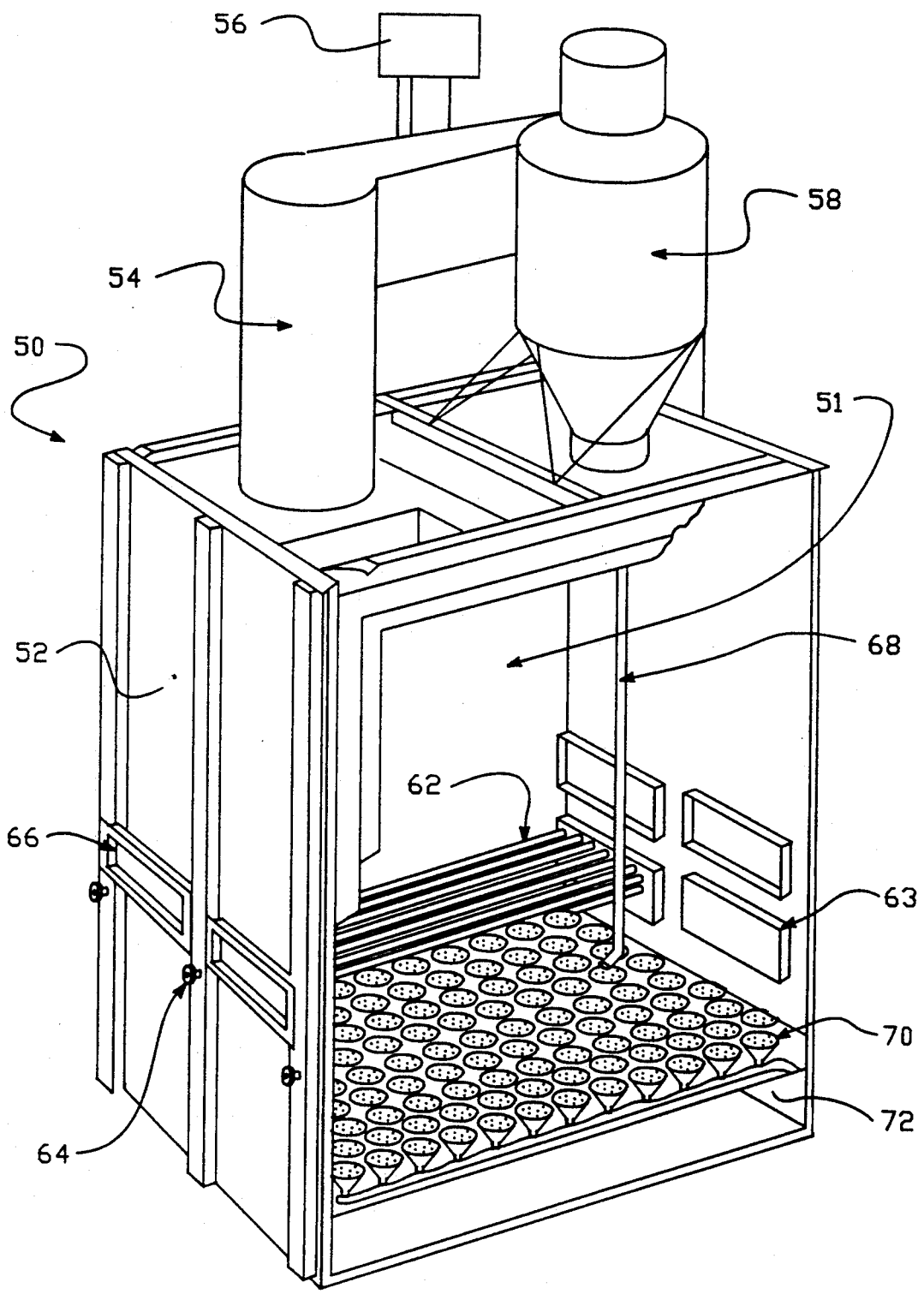
FIG. 2 is a perspective view of a fluidized bed reactor used in accordance with the present invention for emission control and preheating of turbine inlet air.

Details of the fluidized bed reactor 50 are disclosed in FIG. 2. U.S. Pat. No. 4,843,981 filed Dec. 18, 1987, contains detailed descriptions of many aspects of the fluidized bed reactor; this patent is expressly incorporated by reference herein. Fluidized bed reactor 50 includes a housing 52 which defines a central chamber 51 and supports a cyclone riser 54, an ammonia injection apparatus 56 and a recycle cyclone 58. Heat exchangers 62 are mounted on heat exchanger mounting flanges 63. The housing 52 includes fuel feed ports 64. The fluidized bed reactor 50 includes flue gas distribution headers 66. A distribution plate 72 supports air distribution tuyeres 70.

Fluidized bed 53 is a generally horizontal bed of inert particles, ash, and partially burned solid fuel particles. The area above the bed 53 is known as the freeboard 55.

The bed 53 preferably has an average particle size in the range of 100 microns to 800 microns with 20% to 40% less than 200 microns. A preferable particle size is 250 microns to 500 microns.

The primary difference between the prior art fluidized bed combustor and the emission control fluidized bed combustor of the present invention is the relative operation of the fluidized bed. In the fluidized beds used for energy generation, the unit throughput within the fluidized bed is high and the freeboard operates at slightly higher space velocity than the bed. In contrast, the emission control combustor of the present invention has a reduced superficial bed velocity and an increased freeboard velocity since both combustion products from the fluidized bed and the slagging furnace flow through the freeboard.

The combustion of coal in the bed 53 provides energy for the calcination reactions. Bed 53 also provides a large inventory of fine materials, dominated by coal ash, CaO and $CaSO_4$ which, via attrition, provides a high circulation of fines. The bed 53 is fluidized with air which must also be heated. Conventional means are used for directing a continuous stream of fluidizing gas from below the distributor plate 72, through the bed 53, and into the freeboard 55.

To minimize air flow rates and energy input into the bed, superficial velocities are kept very low, preferably, 2 to 2.5 ft/sec. Preferably, fuel is fired in the fluidized bed to reduce the $O_2$ level in the gas leaving the fluidized bed to approximately 3% oxygen. The in-bed heat exchanger surface is matched to this firing duty for a preferable bed temperature of 1,550° F. to 1,575° F. Trimming temperatures and heat transferred from the bed 53 is achieved with manipulation of the bed height.

The fluidized bed reactor 50 is an extremely efficient device for carbon conversion, typically combustion efficiencies range above 99.5% with coal fuels. To achieve high suppression efficiency for $SO_2$ and $NO_x$, the combustion reactions must be completed before the flue gases pass through the emission control areas. Combustion downstream of the emission control areas will generate emissions that are difficult to mitigate. Bed depth, freeboard height and the path length between the cyclones and convective flue gas heat exchangers are selected to provide long residence times at isothermal conditions for efficient emission control and enhanced reactant utilization.

The fluidized bed is fed coal through coal feed 80 and limestone (or dolomite) through limestone feed 82. Preferably, the coal is 1.5 inches to 0.25 inches in size. Because of the fine particulate of the bed, and the elevated temperatures of the heat exchanger surface, heat transfer to the heat exchangers 62 is 2 to 4 times greater than in a conventional fluidized bed combustor. Operating under these conditions, the fluidized bed will elutriate a cloud of particulate comprising ash, unburned fuel, spent sorbent and unreacted sorbent. The elutriation rate is sufficiently high that the entire bed would be rapidly eliminated were it not for the recycle cyclone 58 that captures particulate with an average size greater than 10 microns and returns it to the bed via return conduit 68.

Substantially all of the combustion of the fuel particles takes place within the bed 53. Afterburning of fuel vapors above the bed 53 should be approximately 100° F. The temperature rise in the freeboard due to the further combustion of elutriated vapors is limited so that freeboard temperatures are in the optimum range for the control of $SO_x$ and $NO_x$.

The combustion gas from the fluidized bed 53 and the combustion gas from the refractory heat exchanger 40 rise up with the cloud of fine particulate for a preferable residence time of 3 seconds in isothermal conditions before they enter the recycle cyclone 58. It is during this 3 second residence time that most of the reaction between the hot gas and the calcium oxide occurs, producing solid calcium sulfate from gaseous sulfur dioxide.

The recycle cyclones 58 generate a dust storm of small, high surface area particulates from below 5 micron size to maximum entrained particle size of approximately 350 microns. The recycle cyclones 58 are designed to operate at 85-95 ft/sec inlet velocity; this velocity is high enough to assure surface wear of the sorbent particles which removes the outer layer of $CaSO_4$ exposing previously unavailable CaO. Compared to normal fluidized bed operation, sufficient additional sorbent is added to react the additional $SO_x$ entering with the secondary gas above the fluidized bed. Preferably, the gas from the combustor 30 is angled slightly downward to impact the turbulent surface of the bed 53 and enhance its scrubbing action with the particulate.

Under gas conditions of 3% oxygen and 1,600° F.–1,700° F., ammonia reacts selectively with small quantities of $NO_x$ to produce $N_2$ and $H_2O$. To accomplish this, ammonia is injected into the gas stream by ammonia injector apparatus 56 which is preferably positioned immediately upstream from the recycle cyclone 58. At this location, the injected ammonia may benefit from the turbulent mixing of the gases as they pass through the recycle cyclone 58 at entrance velocities up to 95 ft/sec.

The recycle cyclone 58 captures substantially all of the fine particles and returns them to the bed 53 via return conduit 68. The recycle cyclone 58 thereby facilitates a recycling path from the bed 53 through the freeboard 55 and back into the bed 53. Preferably, this recycling path is maintained at a substantially constant temperature.

The gas leaving the recycle cyclone 58 is approximately 1,650° F. This gas enters the convective air heater 90 where it preheats the compressor airstream from 750° to 1,200° and is itself cooled to approximately 780° F. It next passes through convective evaporator 92 where it vaporizes water for turbine steam injection (or for use in the steam bottoming cycle) leaving the evaporator at a temperature of approximately 640° F. Finally, it passes through the combustion air heater 94, heating combustion air. At this location it preferably cools to 215° F. before passing into baghouse 100 and ID fan 102. The pressurized stream from the convective air heater which returns to the reactor bed 50 travels through the heat exchangers 62 which are positioned in the fluidized bed 53. In this position, the air can be heated to 1,500° F. The heat exchangers 62 may be conventional metallic tube materials.

Preferably, there are multiple horizontal heat exchangers 62 located in the bed 53. The heat exchangers are preferably removable and penetrate from only one side of the fluidized bed reactor 50. Typically, the heat exchangers have five or six layers of two U-tubes that cross the full width of the reactor 50. Supports of the exchangers 62 are dictated by the thermal growth of the tubes and fluidized bed induced loads. Any supports must include provisions to prevent channeling of air along their surfaces, which could cause localized metal wastage.

The group of heat exchangers depicted in FIG. 2 is preferably positioned approximately 25 inches from the reactor end walls and approximately 15 inches from another group of heat exchangers. This allows for easy access and inspection of the heat exchanger groups. The space between the bundles has an additional function. It is the area into which fuel is preferably fed by fuel feed ports 64. On the opposite side, in alternating spaces, return conduits 68 are preferably positioned. Flow of materials from the return conduit 68 into the bed 53 requires that the bed 53 be well fluidized at and below the termination of the return conduit 68.

The power plant 10, depending upon size, may include a number of fluidized beds 50. Generally, the fluidized beds 50 are shop pre-fabricated. Typically, a bed velocity of approximately 2 ft/sec, a freeboard velocity of approximately 8 ft/sec, and a combustor height of about 25 feet are employed. The cross-sectional area of the fluid bed is dependent on the specific requirements of an application.

The steam bottoming cycle employed in connection with steam turbine assembly 110 is entirely conventional. Typically, high pressure steam at 885 psig and 950° F. and low pressure steam at 135 psig and 390° F. are generated in a waste heat boiler 120 from the hot turbine gases. The steam passes through a steam turbine 112, generating electric power and is condensed in condenser 130. Cooling water for the condenser is cooled in the cooling tower 140. Some low temperature steam or evaporation may be used to cool a portion of the slagging coal combustor 30. The steam may be further heated in superheaters before being expanded through the steam turbine.

In sum, the power plant 10 of the present invention may be successfully operated at the following temperatures. The slagging coal burner 30 may be operated at 2,700° F. with the heat being transferred to the refractory heat exchanger 40 operating at 2,300° F. Hot gases leave the refractory heat exchanger 40 at approximately 1,650° F. The cleaned gases leave the recycle cyclone at approximately the same temperature. These hot gases are used to heat the compressed hot air (approximately 225 psig, 745°) from the compressor 26 which is moving through turbine convective air heater 90. This air is then heated to approximately 1,200°. The air is then further heated in the heat exchangers 62 to approximately 1,500° F. After being further heated in the refractory heat exchanger 40, the air is approximately 2,350° F. Additional heating may be realized with the topping combustor 48.

Thus, it is clear that with the present invention, high turbine inlet temperatures are efficiently obtained. This result stems from the novel use of the slagging combustor 30 in conjunction with the fluidized bed reactor 50, where the fluidized bed reactor serves to suppress pollution and preheat turbine input air.

For the sake of completeness, the thermodynamic cycle may be run with the air leaving the turbine 22 at 1090° F. It is conveyed to waste heat boiler 120 and passes through a turbine stack at approximately 240° F. The heated exhaust leaves the convective evaporator 92 at approximately 700° F. Air leaves the combustion air heater 94 at approximately 560° and is conveyed to the combustor 30, refractory heat exchanger 40, and fluid bed reactor 50.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for burning fuel in a combustor comprising the steps of:
    combusting a carbonaceous sulfur-bearing fuel and thereby producing a gas with contaminants; and
    conveying said gas to a fluidized bed reactor including circulating particulate matter and an operating temperature of at least 1,500° F. so that said gas reacts with said circulating particulate matter to reduce said contaminants in said gas;
    injecting a gaseous reactant into said fluidized bed reactor to further reduce said contaminants in said gas;
    positioning heat exchangers within the fluidized bed of said fluidized bed reactor for heating a pressurized air stream within said heat exchangers; and
    conveying said pressurized air stream from said heat exchangers into a refractory heat exchanger closely coupled to said combustor.

2. The method of claim 1 further comprising the step of:
    conveying said pressurized air stream from said refractory heat exchanger to a turbine assembly.

3. The method of claim 2 further comprising the step of:
    heating said pressurized air stream from said refractory heat exchanger with a topping combustor before conveying said air stream to said turbine assembly.

4. A method of operating a fuel burning apparatus, said method comprising the steps of:
    combusting an un-processed carbonaceous sulfur-bearing fuel to produce a gas containing substantial combustion contaminants including Sox and Nox;
    conveying said gas to a fluidized bed reactor including circulating particulate matter and an operating temperature of at least 1,500° F. so that said gas reacts with said circulating particulate matter to reduce said combustion contaminants in said gas;
    injecting a gaseous reactant into said fluidized bed reactor to further reduce said contaminants in said gas;
    positioning heat exchangers within the fluidized bed of said fluidized bed reactor for heating a pressurized air stream within said heat exchangers; and
    conveying said pressurized air stream from said heat exchangers into a refractory heat exchanger closely coupled to said fuel burning apparatus.

5. The method of claim 4 further comprising the step of:
    conveying said pressurized air stream from said refractory heat exchanger to a turbine assembly.

6. The method of claim 5 further comprising the step of:

heating said pressurized air stream from said refractory heat exchanger with a topping combustor before conveying said air stream to said turbine assembly.

7. A fuel burning apparatus comprising:
(A) a combustor for the combustion of an un-processed carbonaceous sulfur-bearing fuel, said combustor producing a gas containing substantial combustion contaminants including $SO_x$ and $NO_x$;
(B) a fluidized bed reactor coupled to said combustor to receive said gas produced in said combustor, said fluidized bed reactor including
  (1) a central chamber which receives said gas from said combustor,
  (2) means for circulating particulate matter,
  (3) means for injecting a gaseous reactant,
  (4) a fluidized bed,
  (5) heat exchangers positioned within said fluidized bed for heating a pressurized air stream within said heat exchangers,
  (6) means for maintaining an operating temperature of at least 1,500° F. within said fluidized bed reactor to facilitate chemical reactions with said fluidized bed reactor between said gas, said circulating particulate matter, and said gaseous reactant to reduce said combustion contaminants in said gas;
(C) a turbine assembly; and
(D) means for coupling said heat exchangers and said turbine assembly to enable said pressurized air stream to drive said turbine assembly, said coupling means including a refractory heat exchanger closely coupled to said combustor, said refractory heat exchanger enabling a portion of the heat from said gas to further heat said pressurized air stream.

8. The apparatus of claim 7 wherein said means for coupling includes a second refractory heat exchanger closely coupled to said refractory heat exchanger with a combustion air feed positioned therebetween, said air feed serving to facilitate further heating of said gas and therefore further heating of said pressurized air stream.

9. The apparatus of claim 7 wherein said means for coupling includes a topping combustor positioned between said refractory heat exchanger and said turbine assembly for additional heating of said pressurized air stream.

10. A fuel burning apparatus comprising:
(A) a combustor for the combustion of carbonaceous sulfur-bearing fuel, said combustor producing a gas with $SO_x$ and $NO_x$ contaminants;
(B) means for conveying a pressurized air stream;
(C) a refractory heat exchanger closely coupled to said combustor for heating said pressurized air stream with said gas;
(D) a fluidized bed reactor coupled to said refractory heat exchanger to receive said gas produced in said combustor, said fluidized bed reactor including
  (1) a central chamber for receiving said gas,
  (2) a fluidized bed positioned proximate to the base of said chamber,
  (3) heat exchangers positioned within said fluidized bed for preheating said pressurized air stream
  (4) means for circulating particulate matter including CaO,
  (5) means for injecting ammonia,
  (6) means for maintaining an operating temperature of at least 1,500° F. to facilitate chemical reactions between
    (a) said ammonia and said $NO_x$,
    (b) said CaO and said $SO_x$, to reduce said contaminants,
(E) a turbine assembly coupled to said means for conveying said pressurized air stream for receiving said pressurized air stream.

11. A fuel burning apparatus comprising:
(A) a combustor for the combustion of carbonaceous sulfur-bearing fuel, said combustor producing gas-containing combustion contaminants;
(B) a fluidized bed reactor coupled to said combustor to receive said gas produce din said combustor, said fluidized bed reactor including
  (1) a central chamber which receives said gas from said combustor,
  (2) means for circulating particulate matter,
  (3) means for injecting a gaseous reactant,
  (4) a fluidized bed,
  (5) heat exchangers positioned within said fluidized bed for heating a pressurized air stream within said heat exchangers,
  (6) means for maintaining an operating temperature of at least 1,500° F. within said fluidized bed reactor to facilitate chemical reactions within said fluidized bed reactor between said gas, said circulating particulate matter, and said gaseous reactant to reduce said contaminants in said gas;
(C) a turbine assembly; and
(D) means for coupling said heat exchangers and said turbine assembly to enable said pressurized air stream to drive said turbine assembly, said means for coupling including a refractory heat exchanger closely coupled to said combustor, said refractory heat exchanger enabling a portion of the heat from said gas to further heat said pressurized air stream.

12. The apparatus of claim 11 wherein said means for coupling includes a second refractory heat exchanger closely coupled to said refractory heat exchanger with a combustion air feed positioned therebetween, said air feed serving to facilitate further heating of said gas and therefore further heating of said pressurized air stream.

13. The apparatus of claim 11 wherein said means for coupling includes a topping combustor positioned between said refractory heat exchanger and said turbine assembly for additional heating of said pressurized air stream.

14. The apparatus of claim 11 wherein said turbine assembly includes:
a turbine with a turbine inlet for receiving said pressurized air stream;
a generator coupled to said turbine to produce electric power; and
a compressor coupled to said turbine to produce said pressurized air stream.

15. The apparatus of claim 14 further comprising a convective air heater coupled to said compressor to heat and convey said pressurized air stream to said heat exchangers of said fluidized bed reactor.

16. The apparatus of claim 15 further including:
a waste heat boiler coupled to said turbine assembly to generate high pressure steam using heat from the air stream exiting said turbine assembly;
a steam turbine coupled to said waste heat boiler to generate electric power from said high pressure steam;
a condenser coupled to said steam turbine to condense steam from said steam turbine to form condensate;

a feed water pump to pressurize said condensate from said condenser and convey it to said waste heat boiler.

17. The apparatus of claim 16 further comprising:

a convective evaporator coupled to said convective air heater, said turbine, and said waste heat boiler;

a combustion air heater coupled to said convective evaporator, said fluidized bed reactor, said refractory heat exchanger, and said combustor; and a baghouse coupled to said combustion air heater.

* * * * *